United States Patent [19]

Wuest et al.

[11] 4,271,135
[45] Jun. 2, 1981

[54] PREPARATION OF FINELY-DIVIDED, WATER-INSOLUBLE SILICATE CATION-EXCHANGERS WITH A NARROW PARTICLE SIZE SPECTRA

[75] Inventors: Willi Wuest, Ratingen-Hoesel; Guenther Just, Hilden; Bernd W. Peters, Solingen, all of Fed. Rep. of Germany

[73] Assignees: Henkel Kommanditgesellschaft auf Aktien, Dusseldorf-Holthausen; Deutsche Gold-und Silber-Scheideanstalt Vormals Roessler, Frankfurt am Main, both of Fed. Rep. of Germany

[21] Appl. No.: 81,824

[22] Filed: Oct. 4, 1979

Related U.S. Application Data

[63] Continuation of Ser. No. 926,866, Jul. 24, 1978, abandoned.

[30] Foreign Application Priority Data

Jul. 29, 1977 [DE] Fed. Rep. of Germany ....... 2734296

[51] Int. Cl.³ ............................................. C01B 33/28
[52] U.S. Cl. ................................... 423/329; 252/131; 252/135; 252/174.25; 423/328
[58] Field of Search ............. 423/328, 329; 252/89 R, 252/131, 135

[56] References Cited

U.S. PATENT DOCUMENTS

| | | | |
|---|---|---|---|
| 2,882,243 | 4/1959 | Milton | 423/328 |
| 3,058,805 | 10/1962 | Weber | 423/328 |
| 3,985,669 | 10/1976 | Krummel et al. | 252/89 R |
| 4,041,135 | 8/1977 | Williams et al. | 423/329 |
| 4,071,377 | 1/1978 | Schwuger | 423/329 |
| 4,102,977 | 7/1978 | Sugahara et al. | 423/328 X |

Primary Examiner—Edward J. Meros
Attorney, Agent, or Firm—Hammond, Littell, Weissenberger and Muserlian

[57] ABSTRACT

A method for the preparation of finely-divided, water-insoluble, aluminosilicate cation-exchangers with a narrow particle size spectra suitable for detergent formulations comprising:

(1) agitating a water-dissolved alkali metal silicate at a temperature of from 55° C. to 95° C.

(2) mixing therewith at a temperature of from 55° C. to 95° C. over a period of from three seconds to five minutes with vigorous agitation, a water-dissolved alkali metal aluminate, in the presence of an excess of alkali to give a suspension of a silicate compound containing bound water and having a calcium binding power, when measured at 22° C. by the Calcium Binding Power Test Method, of at least 50 mg CaO/gm of anhydrous active substance, and having the formula, bound water not shown,

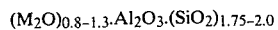

$$(M_2O)_{0.8-1.3} \cdot Al_2O_3 \cdot (SiO_2)_{1.75-2.0}$$

wherein M represents an alkali metal, wherein said reactant solutions when mixed have a composition corresponding to the desired $Al_2O_3$ and $SiO_2$ amounts of the above formula, with a ratio of from 3.2 to 4.4 mols $M_2O$/mol $Al_2O_3$ and a ratio of from 70 to 85 mols of water/mol $Al_2O_3$, (3) maintaining said silicate compound suspension after said mixing step is completed, for a period of from two to twenty minutes under the agitation and temperature conditions of said mixing step, (4) rapidly heating said silicate compound suspension at least 5° C. above the temperature of said mixing step to a temperature of from 60° C. to 100° C., (5) allowing said silicate compound suspension to crystallize at said elevated temperature of from 60° C. to 100° C. while agitating sufficiently to keep said suspension flowable, (6) adjusting said crystalline silicate compound suspension to a pH of below 12.5, and (7) recovering said crystalline silicate compound.

18 Claims, No Drawings

PREPARATION OF FINELY-DIVIDED, WATER-INSOLUBLE SILICATE CATION-EXCHANGERS WITH A NARROW PARTICLE SIZE SPECTRA

This is a continuation of Ser. No. 926,866, filed July 24, 1978, and now abandoned.

BACKGROUND OF THE INVENTION

The invention relates to a method of producing finely-divided, water-insoluble silicates which are capable of cation exchange, and which still contain bound water, of the general formula I:

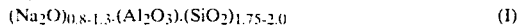

$$(Na_2O)_{0.8-1.3} \cdot (Al_2O_3) \cdot (SiO_2)_{1.75-2.0} \qquad (I)$$

These finely-divided, water-insoluble silicate cation-exchangers of the above formula can be called "aluminosilicates."

These aluminosilicates, optionally also in the form of the suspensions produced, are suitable for further processing and for the production of washing and cleansing agents. The invention, therefore, also relates to the suspensions, obtainable in accordance with the method, and the use thereof, particularly for the production of washing and cleaing agents.

The compounds of general formula I are capable of cation exchange with the hardening constituents of water, that is, magnesium ions and calcium ions. Their calcium binding capacity generally lies above 50 mg CaO/gm of active substance (AS), preferably in the range of from 100 to 200 mg CaO/gm of active substance. The calcium binding capacity can be determined in accordance with the Calcium Binding Power Test Method given in Example 1. The term "active substance" refers to the solid substance obtained by drying for one hour at 800° C. The water-insoluble silicates described above are of particular interrest as contents of washing and cleansing agents, since they are capable of entirely or partially replacing the phosphate builder substances still predominantly used nowadays.

Aluminosilicates of the formula given above, and which are capable of cation exchange, are known. They are generally synthesized by combining solutions of individual components to produce an aqueous synthesizing mixture which mathematically comprises $Al_2O_3$ and $SiO_2$ in the specified ratio, and $Na_2O$ and water. Solutions of sodium aluminate and sodium silicate usually are utilized as starting components.

A large number of different methods are already available for producing such compounds within the scope given above. Specific examples of synthetic aluminosilicates are disclosed in U.S. Pat. Nos. 2,882,243; 2,962,355; 3,010,789; 3,012,853; 2,882,244 and 3,130,007. In addition, a general method is disclosed in German Published Application (DOS) No. 2,412,837. In this published application, a process for washing, bleaching and cleaning, in particular of textiles, is described where aluminosilicates are used. In the specification text, manufacturing processes for the aluminosilicates used are also specifically stated, especialy on pages 26 and 27. In the procedure there described, the starting solutions are mixed together, then stirred rapidly for ten minutes and after that the mixture is left in a crystallizer for several hours. After washing and drying, the products obtained are finely ground in a ball mill and air sifted to separate the fraction over 10μ in particle size. Only when they are in this form, the resulting aluminosilicates are incorporated in detergents (see page 25).

Another method of obtaining finely-divided, water-insoluble aluminosilicates involving a controlled precipitation to avoid formation of a gel structure is described in U.S. Pat. No. 4,041,135.

In addition, commonly-assigned U.S. patent application Ser. No. 765,530, filed Feb. 4, 1977 now abandoned in favor of its continuation Ser. No. 962,906, filed Nov. 22, 1978, now abandoned, describes another method to avoid formation of a gel structure by subjecting the formed aluminosilicate suspension to homogenization by cavitation before crystallization.

Nevertheless, there is still need for a method which, with a short reaction period of the components and a high space-time yield, produces aluminosilicates of the above-mentioned formula which are extremely finely-divided and which, however, have a narrow particle size spectrum or range.

OBJECTS OF THE INVENTION

An object of the present invention is the development of a method for the preparation of finely-divided, water-insoluble, aluminosilicate cation-exchangers with a narrow particle size spectra suitable for detergent formulations comprising:

(1) agitating a water-dissolved alkali metal silicate at a temperature of from 55° C. to 95° C.
(2) mixing therewith at a temperature of from 55° C. to 95° C. over a period of from three seconds to five minutes with vigorous agitation, a water-dissolved alkali metal aluminate, in the presence of an excess of alkali to give a suspension of a silicate compound containing bound water and having a calcium binding power, when measured at 22° C. by the Calcium Binding Power Test Method, of at least 50 mg CaO/gm of anhydrous active substance, and having the formula, bound water not shown.

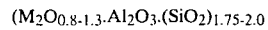

$$(M_2O)_{0.8-1.3} \cdot Al_2O_3 \cdot (SiO_2)_{1.75-2.0}$$

wherein M represents an alkali metal, wherein said reactant solutions when mixed have a composition corresponding to the desired $Al_2O_3$ and $SiO_2$ amounts of the above formula, with a ratio of from 3.2 to 4.4 mols $M_2O$/mol $Al_2O_3$ and a ratio of from 70 to 85 mols of water/mol $Al_2O_3$, (3) maintaining said silicate compound suspended after said mixing step is completed, for a period of from two to twenty minutes under the agitation and temperature conditions of said mixing step,
(4) rapidly heating said silicate compound suspension at least 5° C. above the temperature of said mixing step to a temperature of from 60° C. to 100° C.,
(5) allowing said silicate compound suspension to crystallize at said elevated temperature of from 60° C. to 100° C. while agitating sufficiently to keep said suspension flowable,
(6) adjusting said crystalline silicate compound suspension to a pH of below 12.5, and
(7) recovering said crystalline silicate compound.

A further object of the present invention is the obtaining of finely-divided, water-insoluble calcium-binding aluminosilicates or aluminosilicate suspensions by the above method, having a narrow particle size spectrum.

Another object of the present invention is the development of a process for the production of washing agent compositions, as well as the washing agent compositions themselves, employing said finely-divided, water-insoluble, calcium binding aluminosilicates or aluminosilicate suspensions.

These and other objects of the invention will become more apparent as the description thereof proceeds.

DESCRIPTION OF THE INVENTION

The subject of the present invention is a method of producing the above-mentioned compounds, briefly referred to hereinafter as "aluminosilicates", by mixing water-dissolved sodium aluminate with water-dissolved sodium silicate in the presence of surplus alkali, which method is characterized in that the aqueous solutions, whose total mathematical composition with respect to their $Al_2O_3$ content and their $SiO_2$ content correspnds to the above-mentioned formula I, and corresponds particularly to the composition of the desired product, but which have a total of 3.2 to 4.4 mols of $M_2O$ per mol of $Al_2O_3$ and 70 to 85 mols of water per mol of $Al_2O_3$ of the formula, are rapidly intermixed under agitation, where all the sodium silicate solution was first introduced, and the obtained suspension then being left for a short period of time under agitation at this temperature before the crystallization step is performed at an elevated temperature.

More particularly, the invention relates to a method for the preparation of finely-divided, water-insoluble, aluminosilicate cation-exchangers with a narrow particle size spectra suitable for detergent formulations comprising:

(1) agitating a water-dissolved alkali metal silicate at a temperature of from 55° C. to 95° C.

(2) mixing therewith at a temperature of from 55° C. to 95° C. over a period of from three seconds to five minutes with vigorous agitation, a water-dissolved alkali metal aluminate, in the presence of an excess of alkali to give a suspension of a silicate compound containing bound water and having a calcium binding power, when measured at 22° C. by the Calcium Binding Power Test Method, of at least 50 mg CaO/gm of anhydrous active substance, and having the formula, bound water not shown,

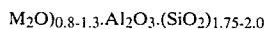

$M_2O)_{0.8-1.3}\cdot Al_2O_3\cdot(SiO_2)_{1.75-2.0}$ wherein M represents an alkali metal, wherein said reactant solutions when mixed have a composition corresponding to the desired $Al_2O_3$ and $SiO_2$ amounts of the above formula, with a ratio of from 3.2 to 4.4 mols $M_2O/mol\ Al_2O_3$ and a ratio of from 70 to 85 mols of water/mol $Al_2O_3$, (3) maintaining said silicate compound suspension after said mixing step is completed, for a period of from two to twenty minutes under the agitation and temperature conditions of said mixing step, (4) rapidly heating said silicate compound suspension at least 5° C. above the temperature of said mixing step to a temperature of from 60° C. to 100° C., (5) allowing said silicate compound suspension to crystallize at said elevated temperature of from 60° C. to 100° C. while agitating sufficiently to keep said suspension flowable, (6) adjusting said crystalline silicate compound suspension to a pH of below 12.5, and (7) recovering said crystalline silicate compound.

The suspension is filtered after crystallization and, after separating the mother liquor, the filter cake is freed from surplus alkali by washing, and the sodium aluminosilicate is dried. A different procedure resides in washing the filter cake and, if required, adjusting it to a pH value of less than 12.5 by partial neutralization, such as by adding an acid, and further processing the sodium aluminosilicate to form a suspension suitable for the production of washing agents, optionally with the addition of a stabilizing agent to the master batch.

The reaction solutions of, for example, sodium aluminate and sodium silicate, are mixed by introducing the sodium silicate into the reaction vessel and adding the sodium aluminate solution rapidly under agitation.

Basically, the reaction can be performed over a wide range of temperature, but at a preselected temperature within this wide range, which is maintained. The reaction temperature preferably is in excess of room temperature.

The reaction can be accelerated by elevating the temperature, and it is preferable to mix the solutions at a selected temperature in the range of between 55° C. and 95° C., preferably between 60° C. and 85° C. The intermixing of the reactants is generally effected within a period of approximately three seconds to five minutes, preferably from ten seconds to three minutes (short time precipitation). The aluminate solution and/or the silicate solution are preheated, for use, preferably to a temperature in the specified range.

The sodium aluminate is generally introduced into the reaction system in the form of a solution of sodium aluminate. However, the ratio of $Na_2O:Al_2O_3$ in the sodium aluminate solution need not necessarily correspond to the formula $NaAlO_2$. On the contrary, other ratios of $Na_2O:Al_2O_3$ are suitable, provided that it is ensured that the composition of the synthesizing mixture, produced by mixing the aluminate solution and the silicate solution, lies in the range specified. Thus, the ratio $Na_2O/Al_2O_3$ in the sodium aluminate solution can be greater or smaller than 1, it being possible as a borderline case, to use the aluminate in the form of a reactive aluminum hydrate is converted to sodium aluminate by the alkali, then correspondingly enriched in the silicate solution, upon mixing in situ. The ratio of $Na_2O$ to $Al_3O_3$ in the aluminate solution is generally in excess of 1.5, for example, in the range between 2.0 and 3.5. The range between 2.0 and 3.2 is usually preferred.

The composition of the silicate solution can also be varied within wide limits in conformity with the composition of the aluminate solution which is variable within wide limits. In general, the silicate is used as a water-soluble silicate having a varying alkali metal content, for example, in the form of water glass. Alternatively, a low-alkali metal silicate can be used provided that the presence of the surplus alkali, required in accordance with the invention, is ensured by an enrichment of alkali in the sodium aluminate solution, a borderline case which may be mentioned being that of reactive silicic acid which is converted to an alkali metal silicate in situ in the synthesizing mixture under the reaction conditions. It is most advantageous to use a sodium silicate having a molar ratio of $Na_2O:SiO_2$ of approximately 1:1 to 1:4, particularly 1:2.0 to 1:3.8.

The mother liquor produced by the method in accordance with the invenion can be used, optionally after previous evaporation, for producing further starting solutions. This also applies particularly to the production of alkali metal silicate solutions, since the mother liquors are produced virtually free from aluminate.

With respect to the ratio of $SiO_2:Al_2O_3$, the composition of the synthesizing mixture used for the purpose of the invention corresponds, mathematically, to the ratio of 1.75:1 to 2:1, specified above, in the suspended aluminosilicates. The preferred aluminosilicates, particulrly the preferred sodium aluminosilicates, frequently have ratios of $SiO_2:Al_2O_3$ in the range of 1.8 to 1.9. The $SiO_2/Al_2O_3$ ratio in the composition of the suspended aluminosilicate otherwise largely corresponds to that in the composition of the synthesizing mixture.

A particularly important parameter is the quantity of alkali present in the synthesizing mixture. It amounts to 3.2 to 4.4 mol of $Na_2O$ per mol of $Al_2O_3$. A ratio of 3.5 to 4.0 mol of $Na_2O$ per mol of $Al_2O_3$ is preferred. The mathematical $Na_2O$ content or alkali metal oxide content in the isolated aluminosilicate lies within the range specified, namely, generally at 0.8 to 1.2, particularly at 0.9 to 1.15 mol of $Na_2O$ per mol of $Al_2O_3$.

A further essential parameter is the quantity of water present. The water content of the synthesizing mixture should be approximately 70 to 85 mols of $H_2O$ per mol of $Al_2O_3$. Chiefly, quantities of water in the range of from approximately 75 to 80 mol water/mol $Al_2O_3$ have proved to be successful. This range is particularly advantageous when it is a matter of producing products which, in the case of the composition specified, have the maximum possible ion exchange capacity, for example, the maximum possible binding capacity for the hardness forming ions of normal water. Products of this type are preferably highly crystalline and have the structure of the so-called zeolite A. According to the duration of the crystallization step, other crystalline and/or amorphous compounds, such as hydrosodalite, can be present in addition to the zeolite.

For the purpose of carrying out the method, it has proved to be advantageous to leave the suspension for 2 to 20, preferably 5 to 10, minutes with the retention of the temperature and agitating conditions, after mixing of the sodium silicate solution and sodium aluminate solution and the associated precipitation of the aluminosilicate. This processing step is hereinafter designated as the "forming" step. A longer period of forming is possible, but is unnecessary.

Crystalline products are preferred for most of the uses of ion-exchanging aluminosilicates and, correspondingly, the suspension is subjected to a crystallization step only after precipitation and forming. The crystallization step resides in maintaining the suspension of the water-insoluble aluminosilicate at a temperature between 60° C. and 100° C., preferably between 70° C. and 95° C., until the desired degree of crysallization of the suspended aluminosilicate, determinable in a known manner by X-ray photography, has been established.

It has proved to be advantageous, during the crystallization step, to feed only sufficient agitating energy to maintain the reaction mixture flowable or pumpable.

Crystalliztion is also accelerated by increasing the temperature so that, for the purpose of crystallization, it is advantageous to raise the temperatures of the suspension at least intermittently above the temperature which was established for the mixing of the aluminate solution and silicate solution. A method particularly suitable for crystallization is a method in which the temperature of the suspension is increased rapidly at least 5° C. from the mixing and forming temperature and preferably to 90° C. to 95° C. by, for example, the blowing-in of steam and maintaining the suspension in this range of temperature until the desired degree of crystallization in the suspended aluminosilicate has been established or, alternatively, after heating to allow the suspension to drop again to a temperature between 50° C. and 90° C. and maintaining the suspension in this range of temperature until the desired degree of crystallization has been established. The mixing of the aluminate solution and silicate solution, preceding the crystallization step, can be effected at, for example, 60° C. to 70° C.

Alternatively, during the course of the crystallization step, the suspensions can be maintained at an elevated temperature for a longer period than that which, in itself, is necessary to establish the desired degree of crystallization, since this might be desirable in order to influence other properties of the suspension, such as the particle size distribution of the aluminosilicate particles. The duration of the crystallization step can lie between approximately three minutes and several hours. Unexpectedly, it has transpired that, in the case of the described combination of processing measures, particlarly high values of the calcium binding capacity are obtained even in the case of unusally short crystallization times. Thuus, the duration of the crystallization step is generally less than two hours, and is generally approximately five to 65 minutes.

Following the crystallization step, the suspension can be freed from at least a portion of its content of surplus alkali by, for example, washing out. For this purpose, the suspension is freed from at least a portion of the mother liquor by, for example, centrifuging off or filtering off, whereupon more water is added and, if required, the now diluted mother liquor is separated again. The displacement washing technique is particularly advantageous. In general, the pH value is adjusted to a value of less than 12.5. However, the suspensions can also be processed with higher pH values to form washing and cleansing agents.

The composition of the aluminosilicates contained in the suspensions can be determined by conventional elementary analysis. For this purpose, the aluminosilicates comprising the suspension are isolated after washing to a pH value of 10 (in a suspension containing, for example, 30% by weight of dry substance) and are dried until the adhering water has been removed. The formula specified above embraces amorphous compounds as well as compounds of the same gross composition which have been crystallized through to a greater or lesser extent. The degree of crystallization of the aluminosilicate isolated in the manner described above can also be determined by comparing the X-ray diffraction diagrams with samples which have been fully crystallized (maximum intensity of the X-ray diffraction lines).

The concentration of the suspension produced can, fundamentally, be adjusted to an optionally low level by adding the required quantity of water. However, a special advantage of the production method in accordance with the invention is that aluminosilicate particles are obtained which exhibit an unusually favorable suspension behavior. Namely, it is not only possible to produce relatively low concentrated suspensions having solids contents of, for example, 5% to 20% by weight, or suspensions having an average concentration of 20% to 30% by weight, but it is also possible to produce suspensions which, with pH values between 7 and 11.5, are still usable with solids contents in the range between 30% and approximately 53% by weight. The advantages resulting from the production method in this range of concentration are particularly evident, so that, when it is intended subsequently to dry the suspensions, and thus surplus water is not desired, suspensions in accordance with the invention, which are still liquid and are readily pumpable and have solids contents in excess of 35%, in the range of, for example, 37% to 50%, can be used to special advantage.

The term "solids content" refers to the content of compounds of formula I. The solids content is determined by filtering off the aluminosilicates of formula I, carefully washing them until the washing water has a pH value of 10, and then drying them for one hour at 800° C. in order to remove the adhering water. Thus, a suspension in accordance with the invention, and having, for example, a "solids content" of 31% by weight, contains, mathematically, 31% by weight of a product separated and dried in the manner described above.

The pH value of the suspension is generally adjusted by washing to values below 12.5 after the crystallization step. In many cases, it has proved to be advantageous to effect partial neutralization by the adding of acid. Preferably, washing is effected to an alkali content of 3% or less, particularly 2% or less. The percentage data refer to the total weight of the suspension. The pH value of the suspension generally lies between approximately 7 and 11.5, preferably between approximately 8 and 11.

Suitable free acids are particularly the mineral acids, preferably sulfuric acid and phosphoric acid. The acid used for partial neutralization essentially depends upon the intended use of the suspension.

If processing to washing and cleaning agents is intended, it is also possible and advisable to use a substance whose water-soluble salts have surface activity, hence, washing activity, as the acid of neutralization. Suitable acids for the neutralization are thus the anionic surface-active compounds or tensides in their acid form, particularly anionic tensides of the type of the sulfates and sulfonates. These tensides contain in the molecule at least one hydrophobic organic radical, mostly an aliphatic hydrocarbon radical with 8 to 26, preferably 8 to 16 aliphatic carbon atoms.

The tensides of the sulfate type include alkylbenzene sulfonates ($C_{9-15}$ alkyl), mixtures of alkene sulfonates and hydroxyalkane sulfonates, as well as alkane disulfonates, as they are obtained, for example, from monoolefins with terminal or non-terminal double bond by sulfonation with gaseous sulfur trioxide and subsequent alkaline or acid hydrolysis of the sulfonation products. Also suitable are alkane sulfonates which are obtained from alkanes by sulfochlorination or sulfoxidation and subsequent hydrolysis or neutralization, or by the addition of bisulfite onto olefins. Other suitable surfactants of the sulfonate type are the esters of α-sulfofatty acids, e.g. the α-sulfonic acids from hydrogenated methyl or ethyl esters of the coconut fatty acids or palm kernel fatty acids or tallow fatty acids. Other suitable tensides of the sulfate type are the sulfuric monoesters of primary alcohols (e.g. from coconut fatty alcohols, tallow fatty alcohols or oleyl alcohol) and those of secondary alcohols. Furthermore, sulfated fatty acid alkanolamides, fatty acid monoglycerides, or reaction products of 1 to 4 moles of ethylene oxide with primary or secondary fatty alcohols or alkylphenols can be used.

Other suitable anionic surface-active compounds which can be used according to the invention in their acid form for the neutralization are the fatty acid esters or fatty acid amides of hydroxy- or amino-carboxylic acids or sulfonic acids, such as fatty acid sarcosides, fatty acid glycolates, fatty acid lactates, fatty acid taurides or fatty acid isoethionates.

The use of anionic tensides in their acid form for the neutralization or partial neutralization of excess alkali is also of advantage insofar as the suspensions thus prepared have a much better suspension stability, which is of considerable advantage for processing, but also for storage.

Other compounds suitable for stabilizing the suspensions, which can be used as free acids and thus for the partial neutralization, naturally also in the form of their salts, are the polymeric, especially synthetic, polycarboxylic acids. Among these are mentioned, in particular, polyacrylic acid and poly-α-hydroxyacrylic acid. The molecular weight of the suitable compounds of this class is generally above 20,000.

Other suitable stabilizers are the phosphonic acids, particularly the polyphosphonic acids, such as 1-hydroxyethane-1,1-diphosphonic acid, dimethylaminomethane diphosphonic acid, phosphonobutane-tricarboxylic acid, methane-tri-methylenephosphonic acid.

The stabilization of the suspensions can also be achieved by adding to the suspension, stabilizers which have no acid character, such as anionic surface-active compounds, as water-soluble salts. In this case the reduction of the pH value to values below 12.5 or particularly 11.5 must naturally be effected by the above-described measures. For example, the pH value can be reduced by washing and/or by adding acid.

But the further stabilization of the suspensions can also be effected with non-ionic surface-active compounds or tensides, where the water-insoluble non-ionic tensides, that is, compounds with turbidity points in water below about 50° C., particularly below room temperature, are particularly suitable. These compounds have in common that they have a turbidity point in aqueous butyldiglycol solution in the range of about 40° C. to 85° C., particularly 55° C. to 85° C., determined according to DIN 53917.

Among the non-ionic surface-active compounds which are suitable as suspension stabilizers according to the invention are the ethoxylation products of alkanols with 16 to 18 carbon atoms with 1 to 8 mols of ethylene oxide per mol of alcohol.

Other suitable non-ionic stabilizers are found in the group of compounds which have as a hydrophobic radical a long-chained alkyl or alkenyl radical containing mostly 10 to 20, preferably 12 to 18 carbon atoms, which is mostly straight-chained but which can also be branched. Unsaturated, hydrophobic radicals are mostly mono-unsaturated, like the frequently encountered oleyl radical. The hydrophilic group is mostly formed by polyoxyalkylene glycols, like ethylene glycol, propylene glycol, polyoxyethylene glycol or glycerin radicals which are connected with the hydrophobic radical over ester, amide, ether or amino groups. Particularly interesting are the ethylene oxide adducts. Among the ethylene oxide adducts with the same turbidity point, those with the longer hydrophobic radical of $C_{14}$ to $C_{18}$ are generally preferred. Suitable stabilizers, in addition to the ethylene oxide adducts onto fatty alcohols, are the mono- and diethanolamides of carboxylic acids, preferably fatty acids, with 10 to 20, preferably 12 to 18, and particularly 12 to 14 carbon atoms. These compounds are derived primarily from saturated and straight-chained carboxylic acids. The best suitable amides can be considered as reaction products of carboxylic acid amides with ethylene oxide; here, the number of ethylene oxide units is mostly 1 to 6, and particularly 1 to 4.

Ester-like suspension stabilizers which can be employed are the products which can be considered as addition products of ethylene oxide onto the carboxylic acids, for example, the addition products of 1 to 10 mols of ethylene oxide per mol of carboxylic acid. In such esters, polyalcohols with more than two hydroxyl groups, such as glycerin, can also be used as the alcohol component.

Instead of the above-mentioned ethoxylation products, the corresponding ethoxylation products of fatty amines, hence particularly ethoxylation products of preferably saturated primary alkyl amines having 16 to 18 carbon atoms with 1 to 8 mols of ethylene oxide per mol of amine can also be used. Suitable here, too, are the non-ethoxylated amines. But products with 2 to 5 mols of ethylene oxide per mol of amine are also highly suitable. Also mentioned here as stabilizing adducts are the ethoxylated alkylphenols with a turbidity point in water of below room temperature or a turbidity point in aqueous butyldiglycol solution of below 85° C. (DIN 53917). These products have about 5 to 8 mols of ethylene oxide per mol of alkylphenol, adducts with 6 to 7 mols of ethylene oxide being preferred.

The specific compounds which illustrate the above-mentioned classes of non-ionic stabilizing agents are lauric acid monoethanolamide, coconut fatty acid monoethanolamide, myristic acid monoethanolamide, palmitic acid monoethanolamide, stearic acid monoethanolamide, and oleic acid monoethanolamide; lauric-/myristic acid diethanolamide, the diethanolamide of a fatty acid mixture of lauric acid and myristic acid, and oleic acid diethanolamide; an ethoxylation product of 5 mols of ethylene oxide per mol of a saturated alcohol or amine derived from tallow fatty acid, where the non-ethoxylated saturated tallow fatty amine can likewise be used; the adduct of 7 mols of ethylene oxide onto nonylphenol.

The polymeric, preferably synthetic, polyhydroxy compounds, such as polyvinyl alcohol, can be used as compounds suitable as stabilizers, which have neither an acid nor a surface-active character.

If stabilizing additives are used according to the invention, particularly the above-mentioned anionic or non-ionic surface-active compounds, their portion in the suspensions according to the invention can be extremely low, and the desired stabilizing effect can still be obtained. This, too, is a particular advantage of the invention. For example, suspensions prepared according to the invention and subsequently stabilized preferably have an aluminosilicate content of between 30% and 55% by weight, and a content of anionic and/or non-ionic surface-active compounds in the range of 0.1% to 1% by weight. The concentrations can naturally differ from the indicated concentrations in one or other direction, but the indicated range is clearly preferred, particularly the range of 0.2% to 0.7% by weight.

The suspensions produced in accordance with the invention are highly suitable for various uses. By virtue of the special features of their production, particularly by virtue of the combination, in accordance with the invention, of specific preparation ratios with the described, unusually rapid precipitation and virtually immediate further treatment, the stabilities and rheological properties of the suspensions are considerably more favorable than the properties of aluminosilicate suspensions produced in a conventional manner. Therefore, the suspensions can be used as such (stabilized by, for example, adding an anionic or nonionic surface-active substance in the manner described above), for example, as liquid scouring agents, with improved suspension stability. When used as liquid scouring agents, additional tensides or other conventional ingredients of such agents, for example, builder salts from the group of the inorganic and organic sequestrants for the hardness formers of water, can optionally be added.

Another use of the suspensions according to the invention, which is particularly important in practice, is their processing to powdered, dry-appearing products. According to the invention, the suspension is subjected to atomization where the suspension is atomized through nozzles or is applied on rotating disks and is thus finely divided, and the fine droplets formed by the atomization are air dried in a hot air current. The products thus obtained are characterized by a particularly favorable re-suspension behavior. Furthermore, the powdered products obtained according to the invention are excellently suitable for use in washing and cleaning agent compositions. In the above-described applications, the suspensions are preferably used in stabilized form.

A particularly important application of the suspensions according to the invention is the processing of the same to powdered washing and cleaning agents.

The following examples are illustrative of the practice of the invention without being limitative in any manner.

EXAMPLE 1

2553 kg of a sodium silicate solution preheated to 60° C. and having the following molar composition, which had been produced from mother liquor typical of the method, and water glass solution 37/40:

$$1.29\ Na_2O;\ 1.8\ SiO_2;\ 47.14\ H_2O$$

were introduced into a 5 m³ agitating container. 2040 kg of sodium aluminate solution, also at a temperature of 60° C., were added to this silicate solution within 90 seconds under vigorous agitation by means of a four-stage MIG agitator (80 r.p.m.).

The molar composition of the sodium aluminate solution corresponded to:

$$2.31\ Na_2O;\ 1.0\ Al_2O_3;\ 32.59\ H_2O$$

This molar quantity data relates to the total mathematical $Al_2O_3$ quantity present in the sodium aluminate solution and which was chosen as a reference quantity. Thus, the total of the individual data for $Na_2O$, $Al_2O_3$, $SiO_2$ and $H_2O$ results in the molar ratios present in the reaction mixture after fully combining the reactants, that is:

$$3.6\ Na_2O;\ 1.0\ Al_2O_3;\ 1.8\ SiO_2;\ 80.0\ H_2O$$

The adding of the sodium aluminate to the silicate solution was immediately followed by a forming phase of five minutes during which the amorphous precipitation was agitated at an undiminished speed.

After the forming time had ended, the temperature in the agitated container was immediately raised to approximately 90° C. by the blowing-in of steam, five minutes being required for this purpose.

After this temperature had been attained, the suspension was left for 50 minutes at approximately this temperature under constant agitation, then poured onto a filter, washed and subsequently dried.

The calcium binding capacity of the aluminosilicates produced in the Examples was determined in the following manner:

1 gm of aluminosilicate (relative to AS) is added to 1 liter of an aqueous solution containing 0.594 gm of $CaCl_2$ (=300 mg CaO/liter=30° dH) and adjusted to a pH value of 10 with diluted NaOH. The suspension is then vigorously agitated for fifteen minutes at a temperature of 22° C. (±2° C.). After filtering off the aluminosilicate, the residual hardness x of the filtrate is determined. The calcium binding capacity is calculated therefrom in mg CaO/gm AS in accordance with the formula: $(30-x)\cdot 10$. For short hand purposes, the above procedure is hereinafter referred to as the Calcium Binding Power Test Method. In order to determine the residual hardness, the calcium content is determined by titration with ethylenediaminetetraacetic acid.

The product produced in the manner described above had a calcium binding capacity of 164 mg CaO/gm of active substance.

Intermediate samples were examined during crystallization, the suspensions in each case being washed to a pH value between 9 and 11.5 after the crystallization step. The results are given in the following Table.

| Course of Crystallization at T = 90° C. | |
| --- | --- |
| Crystallization Time (Minutes) | Calcium Binding Capacity (mg CaO/gm AS) |
| 20 | 98 |
| 25 | 144 |
| 30 | 160 |
| 40 | 164 |
| 50 | 164 |

Grain Size Distribution

75%<5μ; 97%<10μ;
Position of the maximum particle size range 3 to 5μ. The particle size was determined by means of the Coulter counter method.

EXAMPLE 2

626 kg of a sodium silicate solution, preheated to 60° C. and having the molar composition:

1.29 $Na_2O$; 1.8 $SiO_2$ and 42.41 $H_2O$ were introduced into a 1.5 m³ agitating container.

547 kg of sodium aluminate solution also at a temperature of 60° C. and having a molar composition of:

2.31 $Na_2O$; 1.0 $Al_2O_3$ and 32.59 $H_2O$ were added to the above preparation within 30 seconds under agitation by means of a gate paddle agitator (80 r.p.m.).

The total of the individual data concerning $Na_2O$, $Al_2O_3$, $SiO_2$ and $H_2O$ results in the molar composition of the reaction mixture, that is:

3.6 $Na_2O$; 1.0 $Al_2O_3$; 1.8 $SiO_2$; 75.0 $H_2O$

After the reactants had been combined, there followed a forming phase of five minutes during which the amorphous precipitation was agitated at an undiminished speed. Immediately after the forming time, the temperature in the reaction vessel was raised to approximately 90° C. by the blowing-in of steam, five minutes being required for this purpose. After this temperature had been attained, the suspension was left for 50 minutes at this temperature under constant agitation (80 r.p.m.), poured onto a filter, and subsequently washed. The sodium aluminosilicate produced was further processed to form a suspension (master batch) suitable for producing washing agents.

Final and intermediate samples of the product produced in the manner described above were examined.

| Course of Crystallization at T = 90° C. | |
| --- | --- |
| Crystallization Time (Minutes) | Calcium Binding Capacity (mg CaO/gm AS) |
| 20 | 138 |
| 25 | 162 |
| 30 | 162 |
| 40 | 165 |
| 50 | 165 |

Grain Size Distribution

Position of the maximum particle size range 3 to 4μ. 84%<5μ; 98%<10μ.

The particle size was determined by means of the Coulter counter method.

EXAMPLE 3

The procedure was the same as that given in Example 2, but with the following differences:

Temperature of the aluminate and water glass solution before combining was 70° C. in each case.

Final and intermediate samples were examined.

| Course of Crystallization at T = 90° C. | |
| --- | --- |
| Crystallization Time (Minutes) | Calcium Binding Capacity (mg CaO/gm AS) |
| 20 | 135 |
| 25 | 164 |
| 30 | 166 |
| 40 | 165 |
| 50 | 167 |

Grain Size Distribution

Position of the maximum particle size range 3 to 4μ. 84% <5μ; 96% <10μ

EXAMPLE 4

The procedure was the same as that given in Example 2, but with the following changes:
Formulation:

3.6$Na_2O$.1.0$Al_2O_3$.1.8$SiO_2$.75.0$H_2O$

| Starting Solution at 60° C. | $Na_2O$ | $Al_2O_3$ | $SiO_2$ | $H_2O$ |
| --- | --- | --- | --- | --- |
| Sodium silicate solution | 1.77 | | 1.8 | 40.7 |
| Sodium aluminate solution 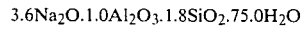 | 1.83 | 1.00 | | 34.3 |

The forming phase following the combining of the reactants was extended to fifteen minutes, but the crystallization was that of Example 2.

Course of Crystallization at T = 90° C.

| Crystallization Time (Minutes) | Calcium Binding Capacity (mg CaO/gm AS) |
|---|---|
| 15 | 58 |
| 20 | 120 |
| 25 | 159 |
| 30 | 166 |
| 50 | 171 |

Grain Size Distribution

Position of the maximum particle size range 3 to 4μ. 84% <5μ; 97%<10μ.

EXAMPLE 5

Pulverulent, flowable washing agents of the compositions given in the following Table were produced in the following manner.

A parent suspension, which had been produced by introducing the sodium aluminosilicate, produced in accordance with Example 2, into a dispersion, heated to approximately 70° C., of a hydrogenated tallow fatty alcohol ethoxylated with 5 mols of ethylene oxide per mol of the alcohol, and which has a content of 40% by weight of aluminosilicate and 0.5% by weight of the dispersing agent, relative to the total weight of the suspension in each case, was pumped from a storage vessel into a container into which were introduced, successively and under agitation, the other components listed in Compositions A and B of the Table and sufficient water to form a washing agent preparation (slurry) containing approximately 45% by weight of water. The slurry was fed by pumping through the atomization nozzles located at the top of an atomization tower and was converted to a fine powder by atomization under the feeding of hot air (approximately 260° C.).

The abbreviations used hereinafter have the following meanings:

"TA+5EO" is a product of addition of 5 mols of ethylene oxide per mol of a substantially saturated fatty alcohol produced by the hydrogenation of tallow fatty acids.

"ABS" is the salt of an alkyl-benzene sulfonic acid having approximately 11 to 13 carbon atoms in the alkyl chain and obtained by condensation of straight-chain olefins with benzene and sulfonation of the alkyl-benzene thus obtained.

"OA+10EO" is a product of addition of ethylene oxide to technical oleyl alcohol in the molar ratio 10:1.

"Water glass" is a sodium silicate ($Na_2O:SiO_2 = 1:3.35$).

"CMC" is the salt of carboxymethylcellulose.

"EDTA": is the salt of ethylenediamine tetraacetic acid.

"Perborate" is a technical product of the approximate composition:

$NaBO_2.H_2O_2.3H_2O.$

"Soap" is the sodium salt of a hardened tallow fatty acid.

All salts are in the form of sodium salt.

TABLE

| Composition A | | Composition B | |
|---|---|---|---|
| ABS | 1.4% | TA + 10 EO | 7.0% |
| OA + 10 EO | 8.0% | TA + 5 EO[2] | 2.7% |
| Sodium tripoly-phosphate | 7.8% | Sodium tri-phosphate | 20.0% |
| Water glass | 5.4% | Soda | 5.0% |
| CMC | 0.8% | Water glass | 3.0% |
| Aluminosilicate[1] (AS) | 36.0% | CMC | 1.8% |
| | | Aluminosilicate[1] (AS) | 18.0% |
| TA + 5 EO[1] | 0.45% | TA + 5 EO[1] | 0.23% |
| The remainder $Na_2SO_4$ and water | | EDTA | 0.5% |
| | | $MgSiO_3$ | 2.5% |
| | | Perborate[3] | 28.0% |
| | | Soap | 2.5% |
| | | The remainder $Na_2SO_4$ and water | |

[1]Introduced with parent suspension.
[2]TA + 5 EO added with the other components.
[3]Added after spray drying the remainder of the slurry.

The preceding specific embodiments are illustrative of the practice of the invention. It is to be understood, however, that other expedients known to those skilled in the art or disclosed herein, may be employed without departing from the spirit of the invention or the scope of the appended claims.

We claim:

1. A method for the preparation of finely-divided, water-insoluble, aluminosilicate cation-exchangers with a narrow particle size spectra suitable for detergent formulations having a grain size distribution with 96% less than 10μ and a mazimum size range of from 3 to 5μ comprising:
   (1) agitating a water-dissolved alkali metal silicate at a temperature of from 60° C. to 85° C.,
   (2) mixing therewith at a temperature of from 60° C. to 85° C. over a period of from three seconds to five minutes with vigorous agitation, a water-dissolved alkali metal aluminate, in the presence of an excess of alkali to give a suspension of a silicate compound containing bound water, and having the formula, bound water not shown, $$(M_2O)_{0.8-1.3}.Al_2O_3.(SiO_2)_{1.75-2.0}$$

wherein M represents an alkali metal, wherein said reactant solutions when mixed have a composition corresponding to the desired $AL_2O_3$ and $SiO_2$ amounts of the above formula, with a ratio of from 3.5 to 4 mols $M_2O$/mol $Al_2O_3$ and a ratio of from 75 to 80 mols of water/mol $Al_2O_3$, (3) maintaining said silicate compound suspension after said mixing step is completed, for a period of from two to twenty minutes under the agitation and temperature conditions of said mixing step,
   (4) rapidly heating said silicate compound suspension at least 5° C. above the temperature of said mixing step to a temperature of from 65° C. to 100° C.,
   (5) allowing said silicate compound suspension to crystallize at said elevated temperature of from 65° C. to 100° C. while agitating sufficiently to keep said suspension flowable for a time sufficient to obtain the desired calcium binding power of from 100 to 200 mg CaO/gm of active substance when measured at 22° C. by the Calcium Binding Power Test Method, but less than two hours, (6) adjusting said crystalline silicate compound suspension to a pH of below 12.5 and (7) recovering said crystalline silicate compound.

2. The process of claim 1 wherein said agitating and mixing steps are conducted at a temperature between 60° C. and 70° C.

3. The process of claim 1 wherein M is sodium.

4. The process of claim 1 wherein said maintaining step (3) is for a period of from 5 to 10 minutes.

5. The process of claim 1 wherein said rapidly heating step is for a period of 5 minutes.

6. The process of claim 1 wherein said crystallization step (5) is conducted at a temperature of from 90° C. to 95° C.

7. The process of claim 1 wherein said crystallization step (5) is conducted at a temperature initially at from 90° C. where during crystallization the temperature is allowed to drop.

8. The process of claim 1 wherein said crystalline silicate compound is recovered as an aqueous suspension.

9. The process of claim 1 wherein said crystalline silicate compound is recovered as a finely-divided pulverulent material.

10. The process of claim 1 wherein said step (6) of adjusting the pH to below 12.5 is conducted by separating at least some of the mother liquor from said crystalline silicate suspension and replacing by water.

11. The process of claim 10 wherein said mother liquor is utilized in the preparation of said water-dissolved alkali metal silicate and/or said water-dissolved alkali metal aluminate.

12. The process of claim 1 wherein said step (6) of adjusting the pH to below 12.5 is conducted by replacing the mother liquor from said crystalline silicate suspension with water until the pH is between 11.5 and 13.5 and thereafter adjusting the pH of the crystalline silicate suspension to from 7 to 11.4 by adding an acid thereto.

13. The process of claim 12 wherein sufficient acid is added to bring the pH to from 8 to 11.

14. The process of claim 13 wherein said acid is a strong mineral acid.

15. The process of claim 13 wherein said acid is an anionic surface-active compound of the sulfate or sulfonate type in the acid form.

16. The process of claim 1 wherein the total weight of the reactants of said mixing step (3) is at least 1173 kg.

17. The process of claim 1 wherein the total time required for steps (2), (3), (4) and (5) is from $30\frac{1}{2}$ minutes to $70\frac{1}{2}$ minutes.

18. The process of claim 1, step (5), wherein said suspension is allowed to crystallize for from 5 to 65 minutes.

* * * * *